United States Patent [19]

Sprague et al.

[11] Patent Number: 4,718,752
[45] Date of Patent: Jan. 12, 1988

[54] INTERPIXEL NULL SUPPRESSION FOR POLARIZED OPTICAL IMAGE BARS

[75] Inventors: Robert A. Sprague, Saratoga; David L. Hecht, Menlo Park; L. Prasadam Flores, Santa Cruz, all of Calif.

[73] Assignee: Xerox Corporation, Stamford, Conn.

[21] Appl. No.: 818,580

[22] Filed: Dec. 23, 1985

[51] Int. Cl.⁴ .................... G02F 1/29; G02B 27/18; G01D 9/42
[52] U.S. Cl. .................... 350/385; 346/108; 350/388; 350/401
[58] Field of Search ........... 350/356, 371, 382, 385, 350/388, 401, 403; 346/108

[56] References Cited

U.S. PATENT DOCUMENTS

| 3,438,692 | 4/1969 | Tabor | 350/401 |
| 3,713,721 | 1/1973 | Watson | 346/108 |
| 4,367,925 | 1/1983 | Sprague et al. | 350/355 |
| 4,396,252 | 8/1983 | Turner | 350/355 |
| 4,437,106 | 3/1984 | Sprague | 346/160 |
| 4,450,459 | 5/1984 | Turner et al. | 346/160 |
| 4,468,084 | 8/1984 | Hutcheson et al. | 350/356 |
| 4,483,596 | 11/1984 | Marshall | 350/385 |
| 4,673,953 | 6/1987 | Hecht | 346/108 |

FOREIGN PATENT DOCUMENTS

| 0021754 | 1/1981 | European Pat. Off. |
| 2139658 | 8/1971 | Fed. Rep. of Germany |

OTHER PUBLICATIONS

Lebedev et al, "A New Type of a Photoelectric Magnetograph", Solar Physics, vol. 48, pp. 417–422, 1976.
Born & Wolf, "Principles of Optics", Pergamon Press, Fifth Ed., 1975, pp. 186–188.

*Primary Examiner*—William H. Punter

[57] ABSTRACT

An optical image bar utilizing polarized light and a coherent spatial light modulator, includes birefrigent spatial or angular shearing means for uniformly dividing the spatially modulated radiation of a coherent image bar into a pair of laterally offset, redundantly modulated, orthogonally polarized optical field distributions. Imaging optics, which include any spatial filtering and/or polarization filtering elements needed for converting those field distributions into correspondingly modulated spatial intensity distributions, bring the filtered field distributions to focus on an output image plane, thereby producing redundantly modulated, laterally offset, intensity profiles on the output image plane which spatially sum with each other on an intensity basis. The magnitude of the shear is selected so that the image plane offset of those intensity profiles is approximately equal to one half of the nominal image plane pixel pitch of the image bar, whereby each of the intensity profiles redundantly overwrites the interpixel intensity nulls of the other. Spatial shearing is preferred for image bars having telecentric imaging optics, but angular shearing is a practical alternative for some embodiments.

15 Claims, 13 Drawing Figures

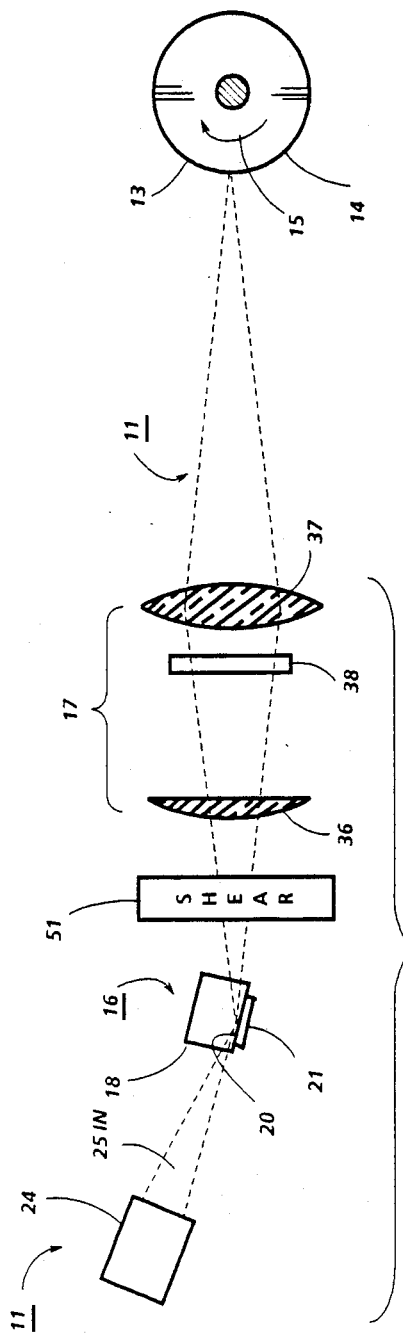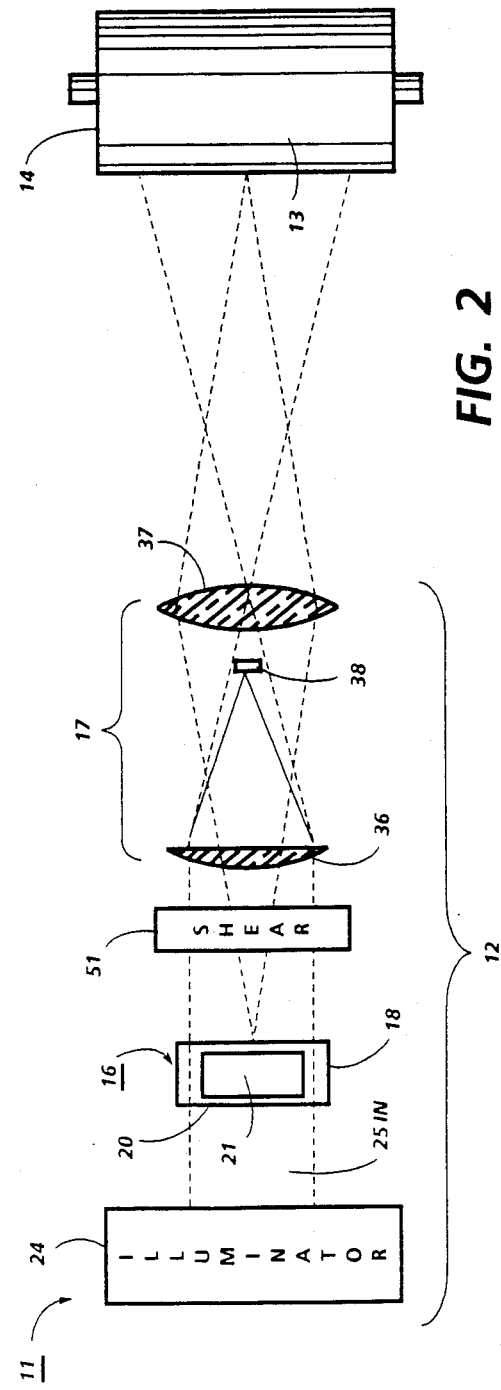

INTERPIXEL NULL SUPPRESSION FOR POLARIZED OPTICAL IMAGE BARS

FIELD OF THE INVENTION

This invention relates to polarized optical image bars and, more particularly, to methods and means for suppressing unwanted interpixel intensity nulls in their output images.

BACKGROUND OF THE INVENTION

As a matter of definition, an "optical image bar" comprises an array of optical picture element ("pixel") generators for converting a spatial pattern, which usually is represented by the information content of electrical input signals, into a corresponding optical intensity profile. If the spatial pattern is superimposed on polarized optical radiation, the image bar is "polarized". Although there are a variety of applications for these image bars in a number of different fields, a significant portion of the effort and expense that have been devoted to their development has been directed toward their application to electrophotographic printing, where they may prove to be a relatively low cost and reliable alternative to the flying spot raster scanners which have dominated that field since its inception. Optical displays may also benefit from the use of such image bars, although their application to that field is a secondary consideration at the present time. Some of the more interesting image bar proposals relate to EO TIR (electrooptic total internal reflection) spatial light modulators. In keeping with the teachings of a commonly assigned U.S. Pat. No. 4,396,252 of W. D. Turner, which issued Aug. 2, 1983 on "Proximity Coupled Electro-Optic Devices," an EO TIR spatial light modulator characteristically comprises a plurality of laterally separated, individually addressable electrodes which are maintained on or closely adjacent a reflective surface of an optically transparent electrooptic element, such as a lithium niobate (LiNbO$_3$) crystal. In operation, substantially the full width of the electrooptic element of such a modulator is illuminated by a linearly polarized, transversely collimated light beam. Thus, when voltages representing the pixels of a linear pixel pattern (e.g., the pixels for a given line of an image) are applied to its individually addressable electrodes, the modulator spatially phase modulates the wavefront of the light beam in accordance with the applied pixel pattern. As a general rule, of course, the spatial wavefront modulation varies as a function of time in accordance with the pixel patterns for successive lines of a two dimensional image, thereby providing a line-by-line representation of the image.

For image bar applications of EO TIR spatial light modulators, prior proposals typically have incorporated Schlieren imaging optics for imaging the modulator onto its output image plane. The frequency plane filtering of a Schlieren imaging system effectively transforms the spatially modulated output radiation of the modulator into a series of correspondingly modulated intensity profiles, but there are embodiments in which a polarization analyzer may be used alone or in combination with a Schlieren stop to read out the spatial modulation produced by the modulator. Thus, as used herein, the phrase "electrooptic image bar" applies to all image bars which embody electrooptic spatial light modulators, regardless of whether the modulators are read out by spatial filtering and/or by polarization filtering.

There have been several significant developments which have reduced the cost and increased the reliability of EO TIR spatial light modulators. Among the improvements that are of particular relevance to image bar applications of these modulators are a "differential encoding" technique that is described in a commonly assigned U.S. Pat. No. 4,450,459 of W. D. Turner et al., which issued May 22, 1984 on "Differential Encoding for Fringe Field Responsive Electro-Optic Line Printers," and an electrical interconnect strategy that is described in a commonly assigned U. S. Pat. No. 4,367,925 of R. A. Sprague et al., which issued Jan. 11, 1983 on "Integrated Electronics for Proximity Coupled Electro-Optic Devices." Briefly, it has been shown that the number of electrodes which such a modulator requires, when used in an image bar having a predetermined resolution, may be reduced by a factor of almost two if the input data samples are differentially encoded on a line-by-line basis prior to being applied to the modulator. Furthermore, it has been demonstrated that more or less conventional VLSI circuit technology can be employed to integrate the modulator electrodes with their addressing and drive electronics, thereby facilitating the orderly and reliable distribution of data samples to the relatively large number of electrodes which customarily are required for reasonably high resolution printing. Electrooptic image bars intrinsically are spatially coherent devices. Axially illuminated EO TIR electrooptic spatial light modulators (i.e., those wherein the incident radiation propogates in a direction that is essentially parallel to the optical axis of the modulator) are especially well suited for use in higher resolution image bars, but they inherently tend to produce interpixel intensity nulls because they spatially modulate the incident radiation by diffractively scattering optical energy into positive and negative diffraction orders which are more or less angularly symmetrical about a zero order or unmodulated component. These positive and negative diffraction orders (collectively referred to herein as "higher order diffraction components") define the upper and lower spatial frequency sidebands, respectively, of the modulated radiation, so they coherently contribute to the effective spatial modulation bandwidth of the modulator, provided that their relative phase is preserved. Unfortunately, however, whenever such spatially coherent radiation is brought to focus to form an image, adjacent pixels of opposite phase destructively interfere with each other, thereby producing undesireable interpixel intensity nulls. For example, differential encoding produces adjacent pixels of opposite phase.

Others who have attempted to develop essentially null-free image bars embodying axially illuminated EO TIR spatial light modulators have recognized that the unwanted interpixel intensity nulls are caused by destructive interference, so their work is most interesting. As described in a commonly assigned U.S. Pat. No. 4,437,106 or R. A. Sprague, which issued Mar. 13, 1984 on "Method and Means for Reducing illumination Nulls in Electro-Optic Line Printers," one of the prior null suppression proposals suggests scattering light into the null regions in accordance with a pattern having an angular orientation and/or a spatial frequency which tends to inhibit the ability of the unaided eye to resolve the nulls, even when the imaging is performed at normal exposure levels. This approach preserves the internal spatial coherency of the output radiation of the image bar (i. e., the relative phase of its positive and negative diffraction orders), while reducing the observable affects of the nulls. Another commonly assigned U.S. Pat. No. 4,483,596 of S. W. Marshall, which issued Nov. 20, 1984 on "Interface Suppression Apparatus and Means for a Linear Modulator," describes an alternative approach pursuant to which a polarization retardation plate or the like is provided for orthogonally polarizing the positive and negative diffraction orders of the modulated output radiation of the image bar, thereby preventing them from destructively interfering with each other. That effectively suppresses the interpixel intensity nulls, but it also destroys the relative phase information between the positive and negative diffraction orders, thereby reducing the effective spatial bandwidth of the image bar by a factor of two. Moreover, it may be relatively diffilcult and expensive to take full advantage of this orthogonal polarization concept in practice because of the wide range of incident angles at which light from different points along an image bar of appreciable width would fall on the polarization retardation plate.

A copending and commonly assigned United States patent application of D. L. Hecht, which was filed Dec. 13, 1985 under Ser. No. 808,709, now U.S. Pat. No. 4,673,953, on "Null Supression for Optical Image Bars" provides a null suppression technique which is believed to be superior to the others, although it initially appeared to be of limited utility because it was developed for polychromatic image bars and relied upon chromatic dispersion for decomposing the spatially modulated output radiation of such an image bar into non-interfering (i.e., mutually orthogonal) and spatially displaced components. As will be appreciated, the wavelength spread that is required is a significant limitation because many image bars, including those which embody laser illuminated EO TIR spatial light modulators, are monochromatic. However, the basic concept of decomposing the spatially modulated output radiation of a coherent image bar into mutually orthogonal components not only preserves the internal spatial coherency of the output radiation of the image bar, but it also is instrumental in producing laterally offset and redundantly modulated intensity profiles which spatially sum with each other on an intensity basis to produce an essentially null-free image having relatively uniformly shaped pixels. The challenge, therefore, is to provide a suitable mechanism for applying such a null suppression technique to monochromatic image bars.

SUMMARY OF THE INVENTION

In accordance with the present invention, an optical image bar utilizing polarized light and a coherent spatial light modulator, includes birefrigent spatial or angular shearing means for uniformly dividing the spatially modulated output radiation of a coherent image bar into a pair of laterally offset, redundantly modulated, orthogonally polarized optical field distributions. Imaging optics, which include any spatial filtering and/or polarization filtering elements needed for converting those field distributions into correspondingly modulated spatial intensity distributions, bring the filtered field distributions to focus on an output image plane, thereby producing redundantly modulated, laterally offset, intensity profiles on the output image plane which spatially sum with each other on an intensity basis. The magnitude of the shear is selected so that the image plane offset of those intensity profiles is approximately equal to one half of the nominal image plane pixel pitch of the image bar, whereby each of the intensity profiles redundantly overwrites the interpixel intensity nulls of the other. Spatial shearing is preferred for image bars having telecentric imaging optics, but angular shearing is a practical alternative for some embodiments.

BRIEF DESCRIPTION OF THE DRAWINGS

Still other features and advantages of this invention will become apparent when the following detailed description is read in conjunction with the attached drawings, in which:

FIG. 1 is schematic sagittal plane view of a line printer embodying a spatial shearing mechanism for carrying out the present invention;

FIG. 2 is a schematic tangential plane view of the printer shown in FIG. 1;

DETAILED DESCRIPTION OF THE ILLUSTRATED EMBODIMENT

Figure 3:
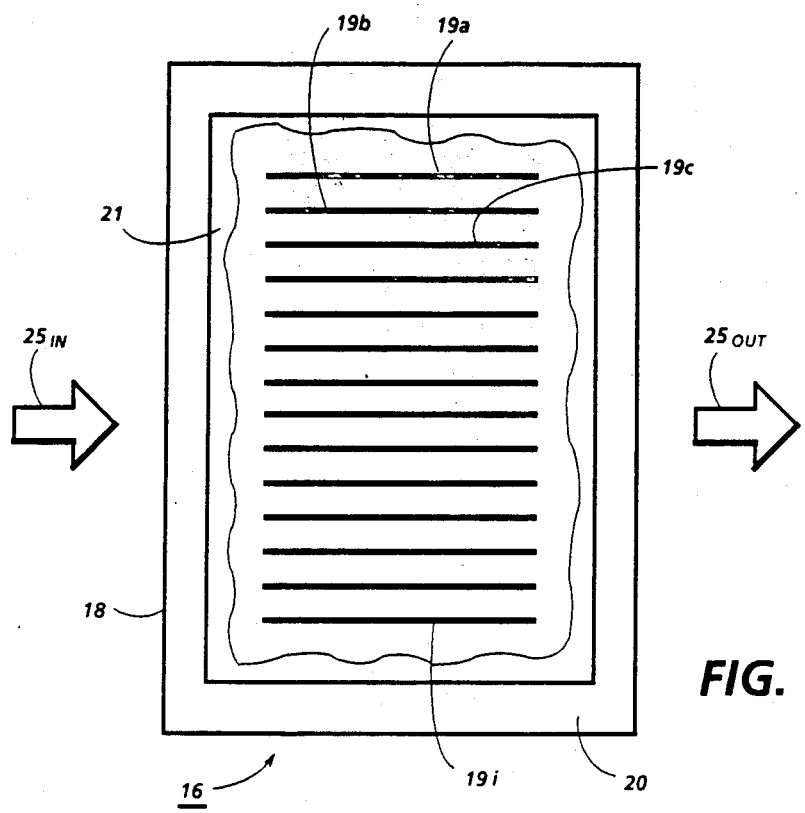
FIG. 3 is a partially cut-away, enlarged bottom view of the spatial light modulator for the printer shown in FIGS. 1 and 2.

While the invention is described in some detail hereinbelow with reference to certain illustrated embodiments, it is to be understood that there is no intent to limit it to those embodiments. On the contrary, the aim is to cover all modifications, alternatives and equivalents falling within the spirit and scope of the invention as defined by the appended claims.

Turning now to the drawings, and at this point especially to FIGS. 1 and 2, there is an electrophotographic line printer 11 having an electrooptic image bar 12 for printing an image on a photosensitive recording medium 13. As shown, the recording medium 13 is a photoconductively coated drum 14 which is rotated (by means not shown) in the direction of the arrow 15. However, there are other xerographic and non-xerographic recording media which could be used, including photoconductively coated belts and plates, as well as photosensitive films and coated papers. The recording medium 13, therefore, can be more generally described as being a photosensitive medium which is exposed while advancing across an image plane in a cross-line direction in the "sagittal plane" relative to the image bar 12.

Figure 4:
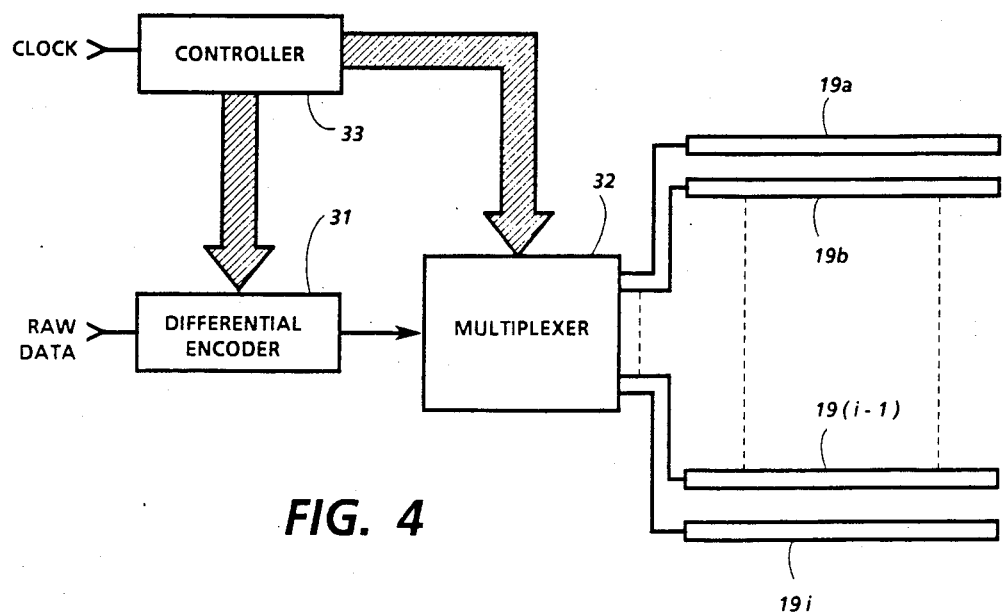
FIG. 4 is a simplified block diagram of a system for applying differentially encoded input data samples to the electrodes of the modulator shown in FIG. 3.

In keeping with accepted practices, the image bar 12 comprises an EO TIR spatial light modulator 16 and a Schlieren imaging system 17. The modulator 16 includes an optically transparent electrooptic element 18, such as an optically polished, y-cut crystal of $LiNbO_3$, and a plurality of individually addressable electrodes 19a–19i (FIGS. 3 and 4). As will be seen, the electrodes 19a–19i are located on, or closely adjacent, a longitudinal reflective surface 20 of the electrooptic element 18. For example, as in other modulators of this type, the electrodes 19a–19i may be integrated with their addressing and drive electronics on a VLSI silicon circuit 21, and the modulator 16 may then be assembled so that the electrodes 19a–19i are pressed firmly against the reflective surface 20. Typically, the electrodes 19a–19i extend lengthwise of the electrooptic element 18 (i.e., parallel to its optical axis) in mutually parallel alignment and are spaced apart laterally in the tangential plane on essentially equidistant centers.

An illuminator 24, such as monochromatic laser, supplies a polarized input light beam $25_{in}$ (it typically is linearly polarized in the tangential plane) which is transversely collimated and, if necessary, expanded (by means not shown) to axially illuminate substantially the full width or tangential dimension of the electrooptic element 18. Means (also not shown) are provided for bringing the input beam $25_{in}$ to a wedge shaped focus on the reflective surface 20 of the electrooptic element 18, thereby enabling the imaging system 17 to establish a relatively straightforward object/image relationship between the modulator 16 and the recording medium 13 (i.e., the output image plane). As will be seen, the input beam $25_{in}$ is incident on the electrooptic element 18 at a near grazing angle of incidence with respect to its reflective surface 20, so the input beam $25_{in}$ is totally internally reflected from the surface 20 to provide an output beam $25_{out}$.

To print a two dimensional image on a line-by line basis, successive sets of input voltage data samples are sequentially applied to the electrodes 19a–19i, thereby causing the modulator 16 to spatially phase modulate the wavefront of the output beam $25_{out}$ as a function of time in accordance with the pixel patterns for successive lines of the image. Preferably, the input data samples are applied to the electrodes 19a–19i in differentially encoded form. As is known, differential encoding causes the voltage levels of the raw input data samples for any given line of an image to determine the sample-to-sample voltage transitions of the differentially encoded data samples for that line. It, therefore, simplifies the construction of the modulator 16 by eliminating the need for ground or reference plane electrodes (not shown). For that reason, as shown in FIG. 4, there is an encoder 31 for differentially encoding the raw data samples on a line-by line basis, a multiplexer 32 for rippling the encoded data samples onto the electrodes 19a–19i, and a controller 33 for synchronizing the encoder 31 and the multiplexer 32. The incoming or raw data samples usually are received as a serial stream at a predetermined synchronous data rate, so the encoder 31 and the multiplexer 32 generally are synchronized by the controller 33 to operate at that rate. Nevertheless, it will be evident that a suitable buffer (not shown) could be provided for temporarily storing either the raw data samples or the encoded data samples should it be found, for example, that a rate change is required or that asynchronous operation is desired.

Returning to FIGS. 1 and 2, the illustrated imaging system 17 comprises a field lens 36 and an imaging lens 37 for bringing the zero order and the higher order diffraction components of the spatially modulated light beam $25_{out}$ to focus on an opaque stop 38 and on the recording medium 13, respectively. The stop 38 is centrally located in the rear focal plane of the lens 36 (i.e., the exit pupil of the imaging optics 17), so it blocks the transversely collimated, zero order components of the light beam $25_{out}$, as indicated by the solid line rays in FIG. 2. However, the higher order diffraction components (collectively represented by dashed line rays in FIG. 2) scatter around the stop 38 and then are collected by the imaging lens 37 to form an image of the modulator 16 on the recording medium 13. This is an example of a central dark field system. It will be apparent however, that a central bright field Schlieren imaging system could be used to read out the spatial modulation produced by the modulator 16, although the phase-to-intensity conversion characteristics of the imaging system would be logically inverted. A polarization analyzer (not shown) could also be used, either alone or in combination with a Schlieren system, for imaging the modulator 16 when both the phase and the polarization of the output beam $25_{out}$ are spatially modulated.

Figure 5:
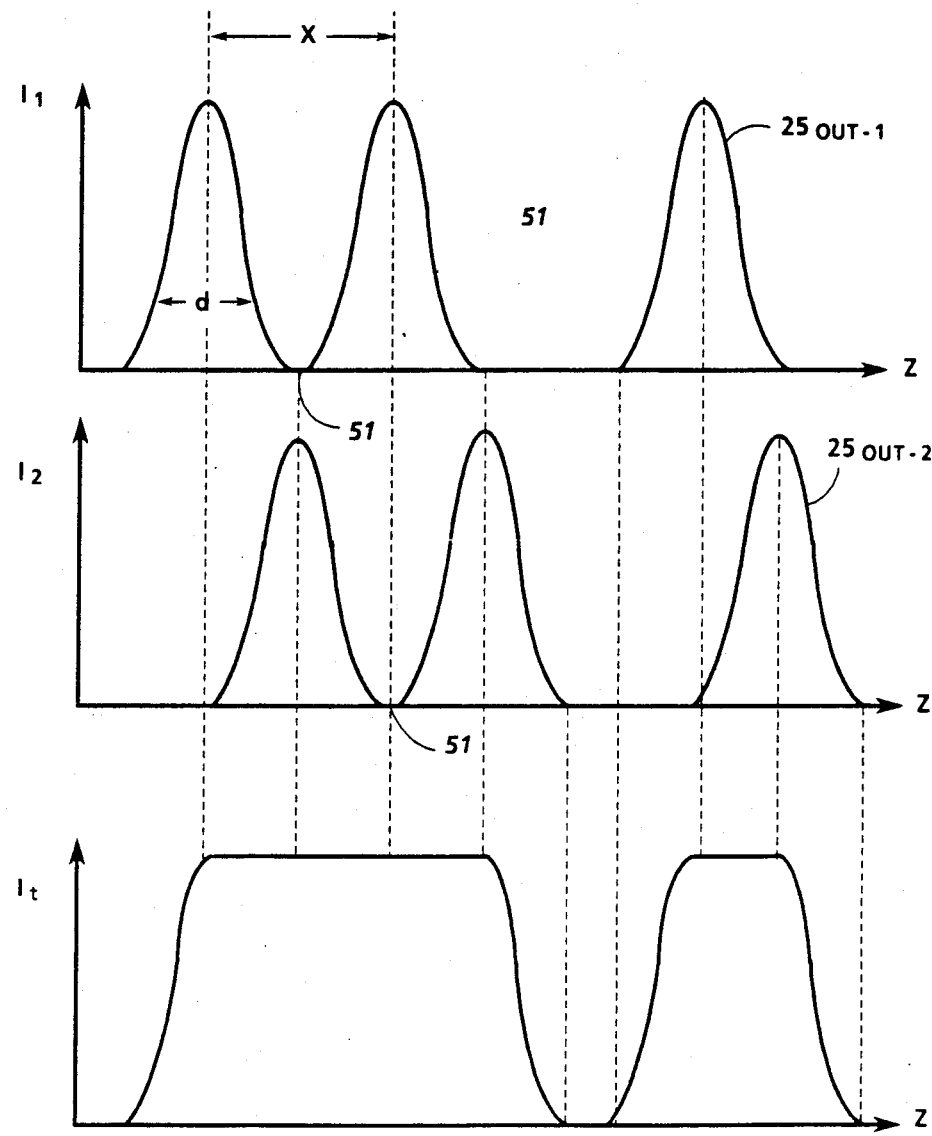
FIG. 5 is a spatial intensity diagram illustrating the image plane intensity summation of orthogonally polarized sheared intensity profiles, whereby interpixel intensity nulls are suppressed in accordance with this invention.

In accordance with the present invention, as illustrated in FIG. 5 by reference to the net effect, the spatially modulated output radiation $25_{out}$ of the modulator 16 is spatially or angularly sheared into two orthogonally polarized, redundantly modulated components $25_{out-1}(l_1)$ and $25_{out-2}(l_2)$ which are laterally offset from each other on the image plane 13 by a distance equal to approximately one half the nominal image plane pixel pitch, X, of the image bar 12 (i.e., the pitch of its electrodes 19a–19i times the magnification occurring between the image bar 12 and the image plane 13). In the absence of the shearing, the coherent interference between the positive and negative diffraction components of the output beam $25_{out}$ would cause the printed pixels to have an image plane diameter, d, equal to approximately one half of the nominal image plane pitch of the image bar 12 (see FIG. 5), thereby producing significant interpixel intensity nulls. In accordance with this invention, however, such interpixel intensity nulls are substantially eliminated, even if the image bar 12 is monochromatic, because the orthogonal polarization of the redundantly modulated sheared components $25_{out-1}$ and $25_{out-2}$ causes them to spatially sum with each other on an intensity basis $(l_t)$ when they are read out on the output image plane 13.

As illustrated in FIGS. 1 and 2, the imaging optics 17 are telecentric, so there advantageously is a shearing mechanism 51 in the telecentric region between the modulator 16 and the imaging optics 17 for spatially shearing the modulated output beam $25_{out}$. The telecentricity which exists in that region causes the spatial shearing mechanism 51 to have substantially the same affect on all points of the image, with the result that little, if any, distortion is introduced. As will be seen, the spatial shearing mechanism 51 may take a variety of forms.

Figure 6:
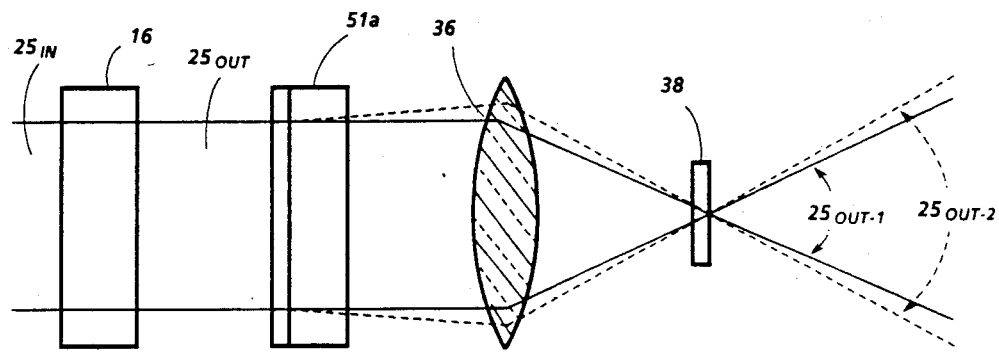
FIG. 6 is an enlarged tangential plane view of a plane parallel birefringent shear plate embodiment of the spatial shearing mechanism for the printer shown in FIGS. 1 and 2.
Figure 7:
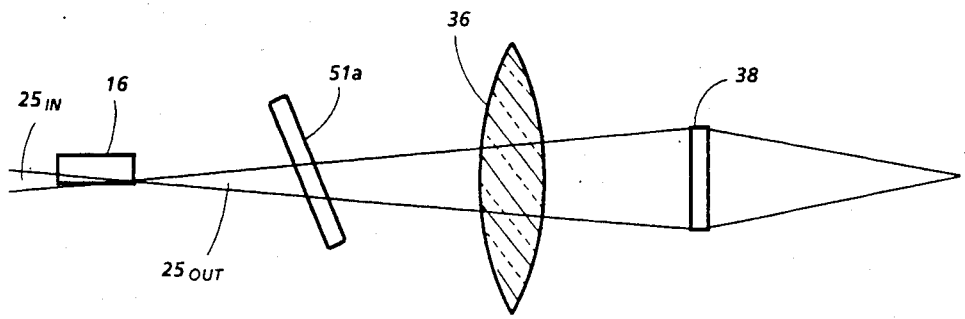
FIG. 7 is an enlarged sagittal plane view of the embodiment shown in FIG. 6.

For example, as shown in FIGS. 6 and 7, a tilted, plane parallel birefringent shear plate 51a may be employed to provide a single component mechanism for performing the spatial shearing. The shear plate 51a is an uniaxial crystal, such a LiNbO₃ crystal, which is cut so that its optic axis (i.e., its z-axis) and it x-axis are coplanar with its face plates and are oriented at approximately +45° and −45°, respectively, with respect to the tangential plane (i.e., the plane in which the spatially modulated light beam $25_{out}$ is linearly polarized). Moreover, the shear plate 51a is tilted about a tangentially extended axis, so that a normal to the plate is angularly offset sagitally from the principal rays (i.e., the unmodulated or "zero order diffraction" components) of the light beam $25_{out}$ by a predetermined tilt angle. As will be appreciated, the shear plate 51a is essentially equidistant from the modulator 16 at all points across the wavefront of the modulated light beam $25_{out}$, so the depth (sagittal dimension) of the space needed to accommodate the shear plate 51a is substantially independent of the tangential dimension of the modulator 16. This is an important consideration, especially for relatively compact image bars and for image bars employing tangentially elongated modulators, such as full image width modulators.

Figure 8:
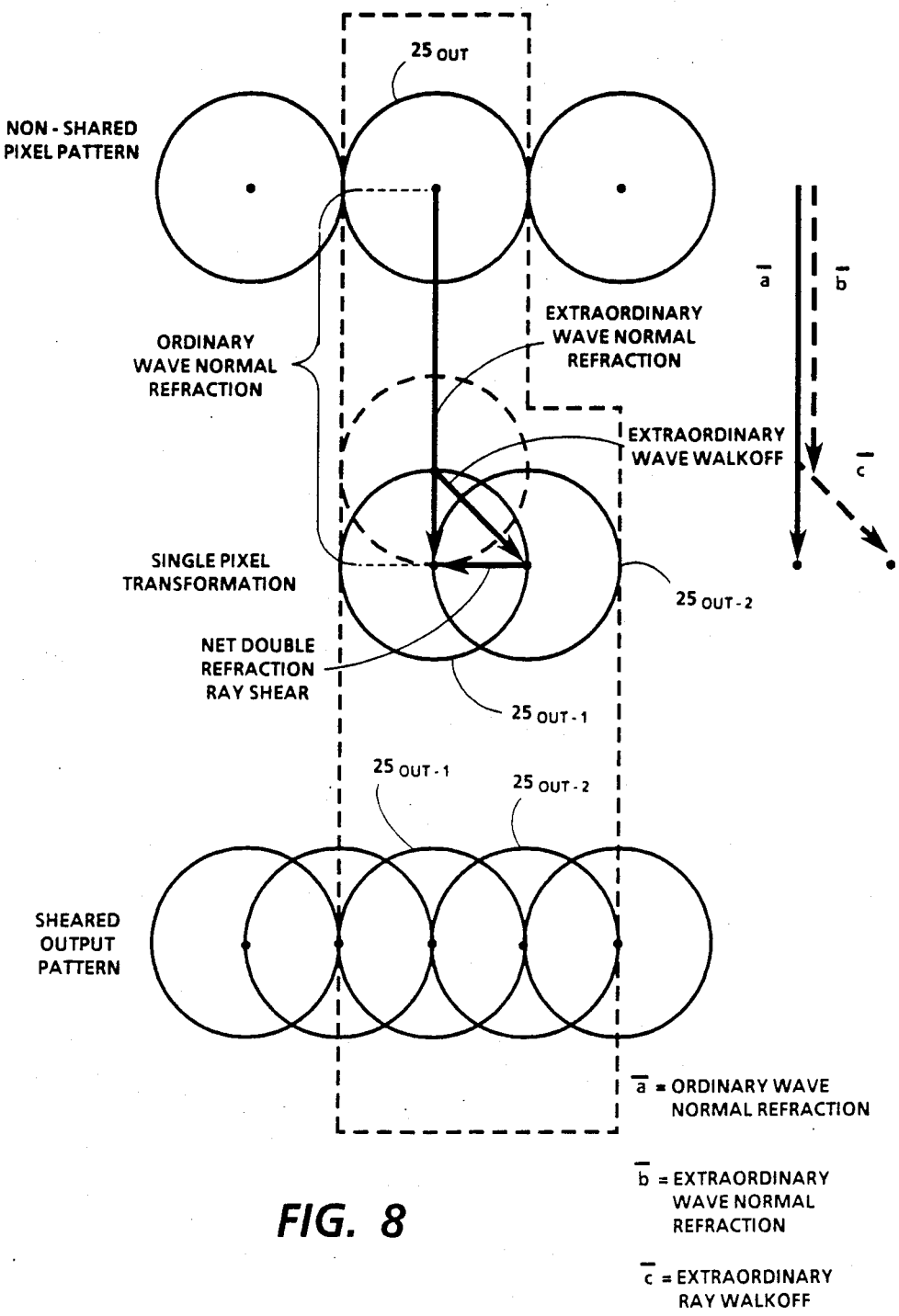
FIG. 8 is a wavevector diagram illustrating the spatial shear produced by the embodiment shown in FIGS. 6 and 7.

In operation, the crystal shear plate 51a (i) decomposes the light beam $25_{out}$ into two more or less equally intense, redundantly modulated field distributions $25_{out-1}$ and $25_{out-2}$, which have ordinary and extraordinary polarizations within the shear plate 51a, and (ii) produces a lateral (i.e., tangential direction) offset between those field distributions which is determined by the birefringence and thickness of the shear plate 51a and by the incident angle of the light beam $25_{out}$. Minor adjustments to the angular orientation of the x and z-axes of the birefringent shear plate crystal may improve the intensity balance of the two optical field distributions $25_{out-1}$ and $25_{out-2}$. For example, in one case it was found that substantial balance was achieved by orienting the z-axis of a LiNbO₃ crystal shear plate at almost 46° with respect to the tangential plane. Additionally, as shown in FIG. 8, it was found the double refraction "beam walk-off" caused by the tilted incidence of the light beam $25_{out}$ on the optic axis of such a shear plate compensates over a substantial range of tilt angles (at least from about 10° to about 17° of tilt) for the relative sagittal displacement the sheared field distributions $25_{out-1}$ and $25_{out-2}$ would otherwise experience with a birefringent shear plate tilted about a tangentially extending axis. Thus, the tilt angle may be adjusted to optimize the shear displacement. Similar self-compensating shear plates can be formed from uniaxial birefringent crystals with different birefringence values. To that end, it is noted that the compensation which is achieved is attributable to the superposition of the relative displacements caused (1) by the different refractions of the ordinary and extraordinary wavenormals due to the birefringence of the crystal and (2) by the "walkoff" of the extraordinary polarization within the crystal which causes its principal ray to deviate from its wavenormal. Those superposed effects vectorally sum with each other, so the direction of the net relative displacement may be controlled by careful selection of the magnitude and direction of each of the effects. The thickness of the shear plate 51a, on the other hand, may be increased and decreased to increase and decrease, respectively, the relative lateral offset of the field distributions $25_{out}$ and $25_{out-2}$ as required to accomodate modulators having different electrode pitches inasmuch as their displacement is proportional to the plate thickness.

Figure 9:
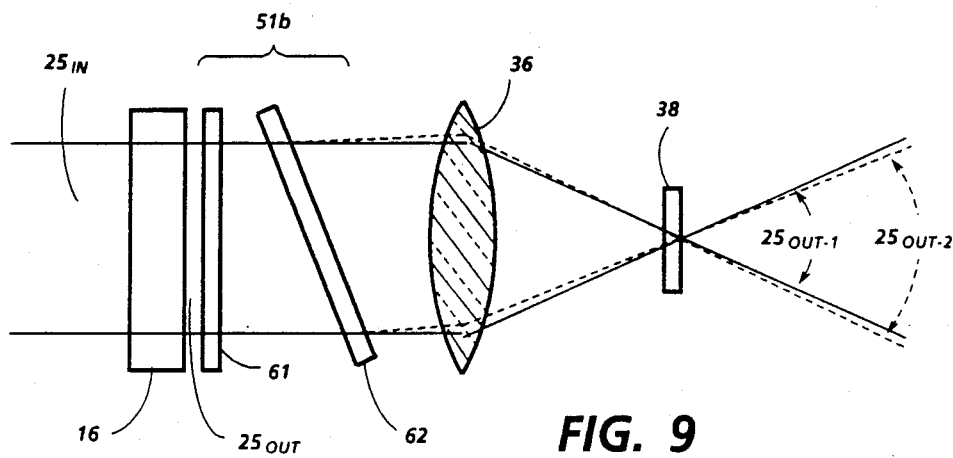
FIG. 9 is an enlarged tangential plane view of another plane parallel birefringent shear plate embodiment of the spatial shearing mechanism for the printer shown in FIGS. 1 and 2.
Figure 10:
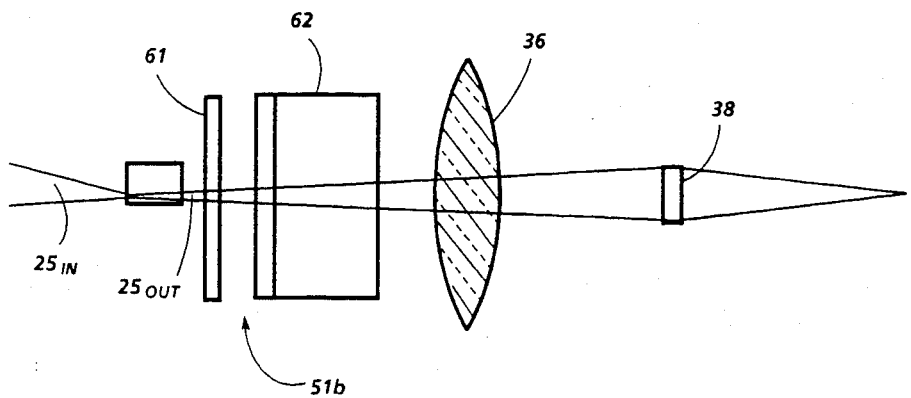
FIG. 10 is an enlarged sagittal plane view of the embodiment shown in FIG. 9.
Figure 11:
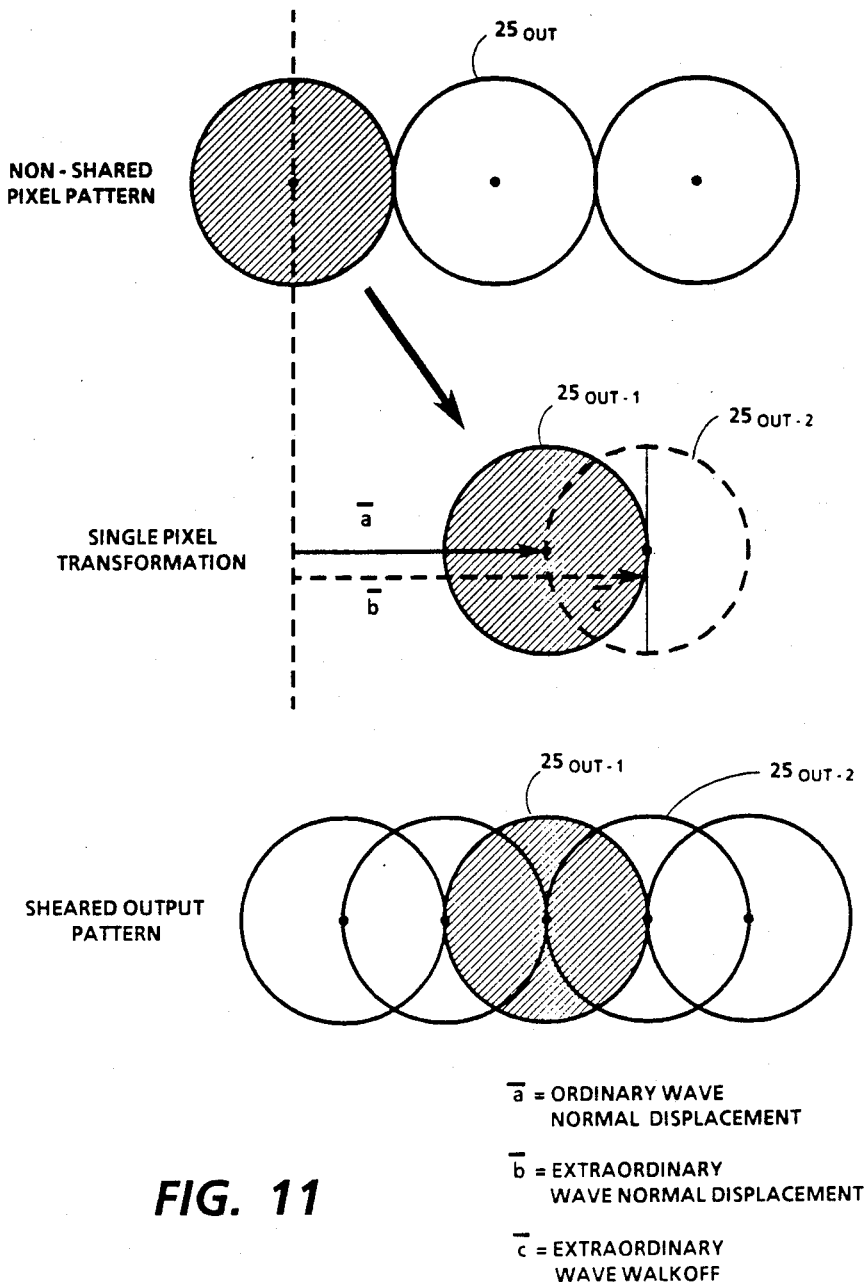
FIG. 11 is a wavevector diagram illustrating the spatial shear produced by the embodiment shown in FIGS. 9 and 10.

Alternatively, as shown in FIGS. 9 and 10, a shearing mechanism 51b comprising a half wave plate 61 and a plane parallel birefringent shear plate 62 may be located in the telecentric region between the modulator 16 and the imaging optics 17 for spatially shearing the modulated output beam $25_{out}$. The half wave plate 61 is disposed between the modulator 16 and the shear plate 62 and has its optic axis angularly oriented at about 22.5° with respect to its tangential axis, so it rotates the polarization plane of the output beam $25_{out}$ to an angle of approximately 45° with respect to the tangential plane. The shear plate 62, on the other hand, is cut from a LiNBO 3 crystal or the like, so its optic (z) and x-axes lie in its face planes and are oriented in the tangential and sagittal planer respectively. The shear plate 62 spatially shears the output beam $25_{out}$ into more or less equally intense, orthogonally polarized, redundantly modulated field distributions $25_{out-1}$ and $25_{out-2}$. To perform that function, the shear plate 62 is titled about a sagittal axis which is normal to a plane containing its optic axis and the tangential axis of the modulator 16 (i.e., the axis of symmetry of the modulated light beam $25_{out}$). As a result, the relative displacements caused by the birefringence of the shear plate 62 and by the "beam walkoff" of the extraordinary polarization are both tangentially directed (FIG. 11). If desired, a shear plate not having the "walkoff" effect could be produced by interchanging the x and z-axes of the shear plate 62. Again, minor adjustments may be made to the angular orientation of optic axis of half wave plate 61 to more precisely balance the intensities of the optical field distributions $25_{out-1}$ and $25_{out-2}$, and the tilt angle of the shear plate 62 may be adjusted to optimize the shear separation. Also, the thickness of the shear plate 62 may be increased or decreased to increase or decrease, respectively, the lateral offset between the sheared field distributions $25_{out-1}$ and $25_{out-2}$ because the magnitiude of the shear essentially varies linearly therewith.

Figure 12:
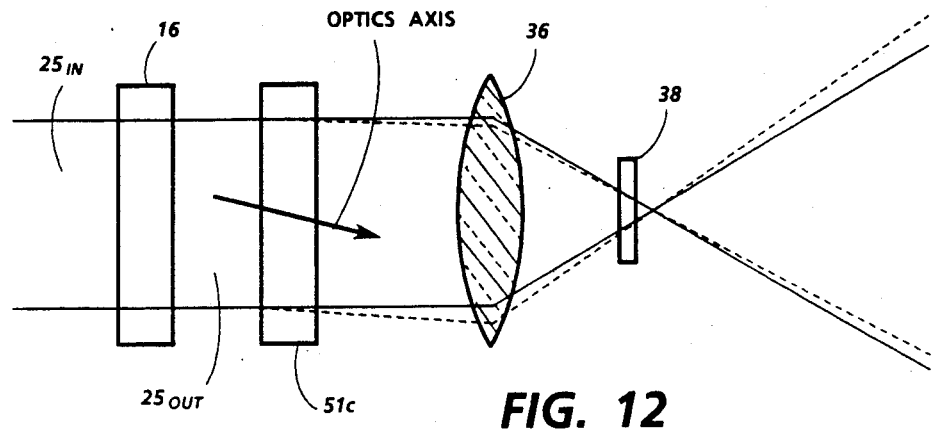
FIG. 12 is an enlarged tangental plane view of an optically active birefringent crystal implementation of spatial shearing for the printer shown in FIGS. 1 and 2.
Figure 13:
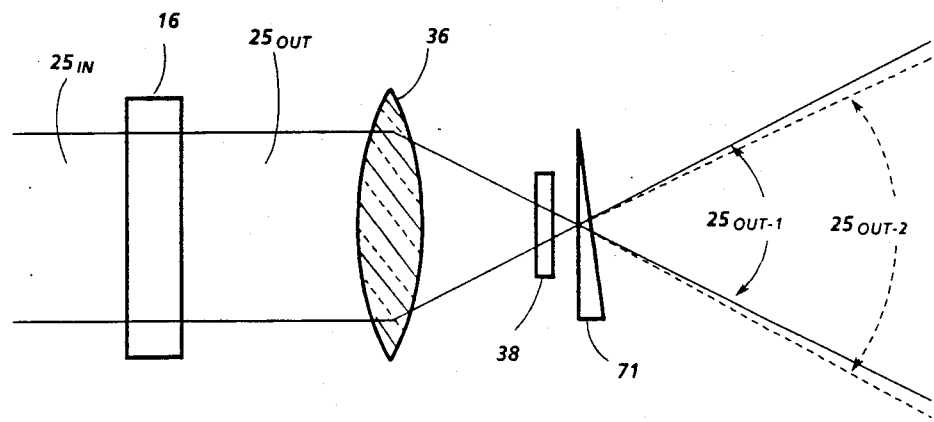
FIG. 13 is a partial tangential plane view of a line printer having an angular shearing mechanism for carrying out an alternative implementation of this invention.

Still another spatial shearing mechanism is shown in FIG. 12 where there is an optically active uniaxial crystal 51c, such as a quartz crystal, in the telecentric region between the modulator 16 and the imaging optics 17. The crystal 17 has its optic or z-axis tangentially aligned with the optical axis of the image bar 12, but tilted in the sagittally plane at a predetermined angle with respect thereto. Thus, the crystal 51c decomposes the spatially modulated light beam $25_{out}$ into two laterally offset, redundantly modulated optical field distributions $25_{out-1}$ and $25_{out-2}$ which have orthogonal elliptical polarizations. In this case, the relative lateral offset of the field distributions $25_{out-1}$ and $25_{out-2}$ is determined by the circular birefringence and the tilt angle of the crystal 51c, and is proportional to its thickness. While spatial shearing of the modulated light beam $25_{out}$ in the telecentric region of the image bar 12, as above-described, has the advantage of producing essentially the same amount of relative lateral offset between the decomposed field distributions $25_{out-1}$ and $25_{out-2}$ at all points across the full width or tangential dimension of the image bar 12, angular shearing is another practical alternative for achieving the broader goals of this invention. Thus, as shown in FIG. 13, there is a birefringent prism 71 which is located in or near the aperture plane of the imaging optics 17 (i.e., the plane of the stop 38) for angularly shearing the spatially modulated light beam $25_{out}$ to produce two more or less equal intensity, orthogonally polarized, redundantly modulated components $25_{out\text{-}1}$ and $25_{out\text{-}2}$ which are sagitally aligned but angularly offset from each other tangentially by a predetermined offset angle. Thus, the relative lateral offset of the decomposed components $25_{out\text{-}1}$ and $25_{out\text{-}2}$ is not uniform at all points across the image plane 13, but the non-linear distortion that is introduced because of that non-uniformity may be minimized by selecting the prism 71 so that it produces the desired amount of relative offset at approximately the tangential midpoint of the output image.

CONCLUSION

In view of the foregoing, it will now be understood that the present invention provides methods and means for suppressing interpixel intensity nulls in the output images of coherent image bars, including monochromatic image bars, without reducing their effective spatial modulation bandwidth or degrading their resolution. In other words, it will be appreciated that achromatic null suppression is achieved in accordance with this invention while employing the full aperture of the imaging optics, so there is no significant loss of single pixel contrast or of pixel edge sharpness.

What is claimed is:

1. In combination with a coherent optical image bar for converting a spatial input pattern into a corresponding output image; said image bar including a spatial light modulator for spatially modulating a polarized coherent light beam in accordance with said spatial input pattern to provide a spatially modulated output beam, and imaging optics for reading out the spatial modulation of said output beam onto an output image plane; said image bar having a predetermined nominal image plane pixel pitch and providing individual pixels having image plane diameters equal to approximately one half said pixel pitch, the improvement comprising a birefringent shearing means optically interposed between said modulator and said image plane for decomposing said output beam into a pair of laterally offset, redundantly modulated, orthogonally polarized, optical field distributions of substantially equal intensities, whereby said field distribution sum with each other on an intensity basis on said output image plane to form said image, said shearing means being selected to laterally offset said field distributions from each other on said output image plane by approximately one half the nominal image plane pixel pitch of said image bar, whereby said image is essentially free of interpixel intensity nulls.

2. The improvement of claim 1 wherein said modulator is an electrooptic spatial light modulator which is axially illuminated by said polarized light beam.

3. The improvement of claim 2 wherein said imaging optics are telecentric, and said shearing means is a spatial shearing mechanism disposed between said modulator and said imaging optics.

4. The improvement of claim 3 wherein said shearing mechanism comprises a uniaxial birefringent crystal.

5. The improvement of claim 4 wherein said crystal has orthogonal axes, including an optic axis; and parallel input and output faces which contain said optic and another of said orthogonal axes.

6. The improvement of claim 5 wherein said light beam is linearly polarized tangentially with respect to said modulator.

7. The improvement of claim 6 wherein said optic axis and said other axis of said crystal are oriented at approximately ±45°, respectively, with respect to a tangential plane whereby said crystal decomposes said output beam into two substantially equally intense, redundantly modulated, optical field distributions having ordinary and extraordinary polarizations within said crystal; and said crystal is tilted at a predetermined angle about said tangential axis, whereby principal rays of said output beam strike the optic axis of said crystal at a predetermined tilt angle selected to align said decomposed field distributions with each other in a sagittal plane.

8. The improvement of claim 7 wherein said crystal is substantially parallel to said modulator in said tangential plane.

9. The improvement of claim 8 wherein said modulator has a tangentially extending reflective surface, and said light beam strikes said reflective surface at a near grazing angle of incidence, whereby said light beam is totally internally reflected from said reflective surface to cause said modulator to operate in a TIR mode.

10. The improvement of claim 5 wherein said optic axis and said other axis of said crystal are tangentially and sagittally aligned, respectively, with said modulator, said light beam is linearly polarized along a predetermined one of said axes, said shearing mechanism further includes a half wave plate disposed between said modulator and said crystal, said half wave plate having an optic axis oriented in a sagittal plane at approximately 22.5° with respect to a tangential plane, whereby said half wave plate rotates the polarization of said output beam by approximately 45°, and said crystal has its input and output faces tilted about a sagittally extending axis at a predetermined angle with respect to said modulator, with said sagittally extending axis being normal to the optic axis of said crystal.

11. The improvement of claim 10 wherein said light beam is linearly polarized along a tangentially extending axis.

12. The improvement of claim 3 wherein said spatial shearing mechanism is an optically active, uniaxial crystal having a optic axis aligned tangentially with respect to said modulator, but tilted sagittally with respect thereto at a predetermined angle selected to cause said crystal to decompose said output beam into two substantially equally intense, orthogonal, elliptical polarization components and to laterally offset said polarization components from each other.

13. The improvement of claim 2 wherein said shearing means is an angular shearing mechanism.

14. The improvement of claim 13 wherein said imaging optics has an aperture plane, and said angular shearing mechanism is disposed approximately in said aperture plane.

15. The improvement of claim 14 wherein said angular shearing mechanism is a birefringent prism.

* * * * *